United States Patent [19]
Banner

[11] 3,851,243
[45] Nov. 26, 1974

[54] POLARITY TESTING ADAPTOR MEANS

[76] Inventor: Philip M. Banner, 28 Oxford Rd., Massapequa, N.Y. 11758

[22] Filed: Dec. 6, 1971

[21] Appl. No.: 204,826

Related U.S. Application Data

[63] Continuation-in-part of Ser. No. 16,477, March 4, 1970, Pat. No. 3,626,354.

[52] U.S. Cl.................. 324/51, 339/32, 339/36
[51] Int. Cl... H01r 27/00, H01r 13/44, G01r 31/02
[58] Field of Search ................ 324/51, 66, 73, 133; 340/255; 339/14, 32, 36, 33; 317/18

[56] References Cited
UNITED STATES PATENTS

| | | | |
|---|---|---|---|
| 2,598,775 | 6/1952 | Fischer | 324/66 |
| 2,994,849 | 8/1961 | Mussari | 339/32 M X |
| 3,113,174 | 12/1963 | Spiteri | 339/36 X |
| 3,130,366 | 4/1964 | Draper | 324/73 R X |
| 3,317,825 | 5/1967 | Huff | 324/66 X |
| 3,426,342 | 2/1969 | De Langis | 340/255 |
| 3,441,896 | 4/1969 | Hawkins | 339/14 R |

FOREIGN PATENTS OR APPLICATIONS

| | | | |
|---|---|---|---|
| 1,386,513 | 12/1964 | France | 339/32 M |
| 917,436 | 9/1954 | Germany | 324/51 |

Primary Examiner—Gerard R. Strecker

[57] ABSTRACT

A polarity testing adapter for single phase three wire systems designed for polarity testing, circuit testing and low voltage detection. It features improved polarity reversing apparatus that corrects the mismating of wiring manually. The adapter means comprises a standard plug at one end, and a socket at the other end which is connected to the plug so as to reverse the wiring at the socket, having a single entry rotatable guide disc with a marker attached to the socket rotatably. Said adapter means having testing apparatus for polarity, voltage, circuits and ground fault.

12 Claims, 8 Drawing Figures

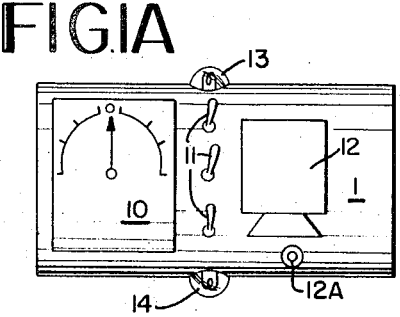
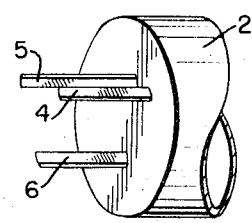
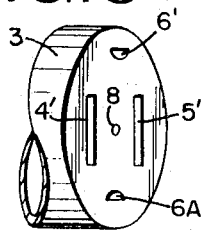
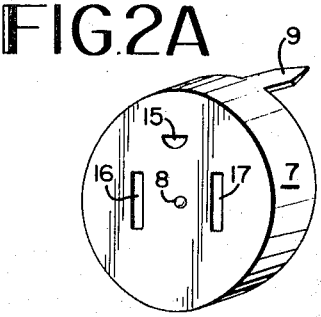
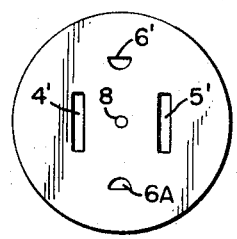
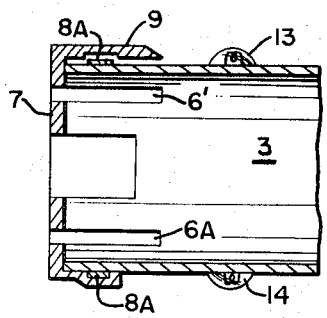
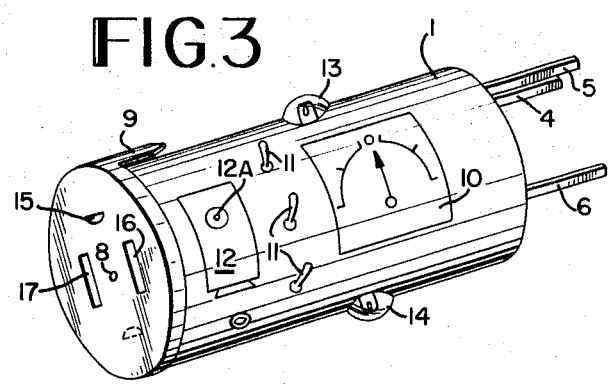
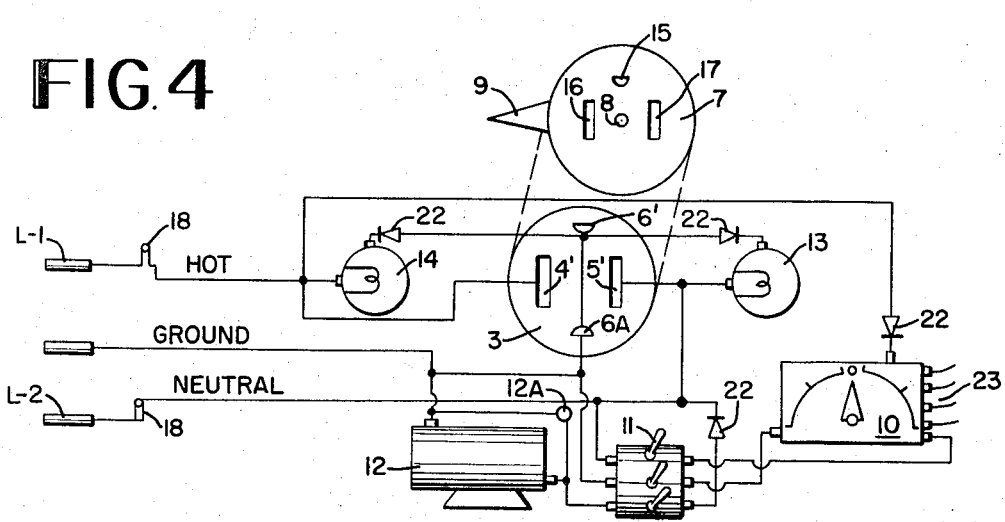

POLARITY TESTING ADAPTOR MEANS

This application is a continuation in part of my prior application Ser. No. 16,477 filed Mar. 4, 1970 and now Pat. 3,626,354 dated Dec. 7, 1971.

That patent shows a Polarity Reversing Adapter Means. The present application is an improvement in that the socket at one end has a single entry guide and marker that blocks the incorrect entry of a plug into the socket and has a marker for identifying the correct entry position. The present invention also has polarity visual testing means, circuit and low voltage testing means that could easily include alarm attachments.

More particularly, the present invention provides an improved polarity testing adapter means comprising polarity reversal improvement features, visual testing means, circuit testing and low voltage detection, in the interests of safety and improving electrical equipment testers used by mechanics and consumers. Three wire AC DC wiring is generally used on boats, the backyards of homes, in factories having machinery, and wherever else any electrical equipment is used that requires grounding protection from the third wire or where reversed polarity and the reversal of wires would adversely affect the safety of the user or cause damage to the electrical supply center or where low voltage would cause fire or equipment damage before the fuse was blown, a common problem. Where one wire is the hot wire, the second wire is the current carrying grounded wire, and the third wire is to protect the user from shocks and to prevent stray grounds for various pieces of equipment which may create a hazard or cause damage because of electrolytic effects, on boats.

The testing of electrical wiring circuits is important in detecting incorrect connection of wiring where the mismating of wiring becomes a serious safety problem when they take it for granted that the third wire for protection is connected and making proper connections. In the case of boats, a polarity condition could easily be fatal in this recreational sport if the unsuspecting person was in contact with the water and touched the metal parts of the boat at the same time. The same holds true on land when anyone uses electricity and the ground is wet and the ground protection wire was eliminated. In factories where a machine operator stands on a wet floor, wet because of rain and a roof leak or other reason, touching a piece of electrically operated equipment that has a broken ground wire is also a serious problem.

In another feature of the invention means have been provided for testing low voltage, a common problem that destroys equipment, causes fires and safety hazards. An electric motor will often fuse and burn before the fuse protector will melt and disengage the circuits. One good example of this is on a boat having an AC operated pump in it's bilge for shoreside use which is very common, and the voltage supplied by the marina drops below the recommended level. The low voltage will actually cause the AC motor to heat up like an iron and smoulder or burn. This Polarity Testing Adapter Means has adequate apparatus to test low voltage, plus providing an alarm means attachment to said adapter.

In another feature of the adapter, apparatus has been provided for circuit testing of each important individual circuit. Such tests will give reasonable assurance of continuity factors and the degree of efficiency of the wiring being tested as to contact and qualitative values. This test will also detect low voltage or a broken wire, a wire without line voltage, imporoper contacts or plug-in, all necessary features important to the user of electricity.

In another feature of the invention, this adapter means has improved apparatus used in reversing the polarity of wiring. The rotatable single entry mask allows but one position to be used on the reversing means, it also has a pointer indicator that points to the right part which the user should plug in to. The testing apparatus having a visual gauge and test lights will in either instance direct the way to use this adapter so as to correct the mismating of wiring. The rotatable mask disc and the pointer plus the means of visual indication are very important to electrical users and to this invention The Polarity Testing Adapter Means.

In another feature of the adapter there is aparatus to test the grounding wire, a safety factor. The testing and correction of a ground fault will affect electrolysis damage to boats and provide the necessary safety. You cannot ground an electrical system to an engine or underwater appendage, particularly when shore current is used. The corrosive action is speeded up as the electric current is increased. Electrically and chemically when two dissimilar metals are submerged in salt water, an electric current will flow from the electro-positive or corroded metal towards the electro-negative or protected metal. The setting up of stray currents could be responsible for severe damage by corrosion "if proper grounding of electrical sources is not completed".

Accordingly, a principal object of the invention is to provide new and improved electrical polarity testing adapter means.

Another object of the invention is to provide new and improved electrical adapter means for reversing polarity by using a rotatable single entry position mask disc and pointer apparatus showing which entry of a plug is correct.

Another object of the invention is to provide new visual test means of polarity control, accomplished by a meter, test lights or both.

Another object of the invention is to provide new and improved test means of determining low voltage and alarm connection.

Another object of the invention is to provide new and improved circuit test means having separate apparatus for testing grounds and live wires.

Another object ov the invention is to make new and improved testing means, known as a adapter and supplied in different forms such as round or square or different shape, or in a rectangular box and made of a number of insulating safe materials as may be necessary for it's use.

Another object of this invention is to provide new and improved alarms for reversed polarity and for low voltage situations wherein the said apparatus being a connection for an alarm or containing a buzzer or warning device within the adapter itself, or externally.

These and other objects of the invention will be apparent from the following specifications and drawings, of which:

FIGS. 1A–1C show a diagramatic view of a feature of the invention, showing an adapter body, a front three blade male plug and a rear female receptacle socket having four recesses.

FIGS. 2A–2C show detailed view of a feature of the invention showing the mechanical construction of a rotating mask disc having a pointer with three recesses, and an other view of the rear of a female socket having four recesses.

FIG. 3 shows a perspective view of other features of the invention all assembled into one adapter unit showing the rotating mask disc having three recesses and a pointer connected to the adapter body showing circuit test lights, a voltage gauge, an alarm connection and a three bladed male plug. FIG. 4 is a schematic electrical plan of the invention showing the circuitry contained therein.

Referring to FIG. 1-A, the invention comprises an adapter 1 having a plug 2 shown in FIG. 1-B and a socket 3 shown in FIG. 1-C. The plug 2 has first and second current carrying prongs 4 and 5, and a third equipment ground prong 6, the three prongs being spaced in a generally triangular arrangement in conventional manner. The plug 2 shown in FIG, 1-B is adapted in various forms of twist lock and straight blade design to adapt to standard parts. The socket 3 shown in FIG. 1-C has four recesses, including a double ground connection, with recesses corresponding to 4', 5', 6' and 6-A. The adapter means shown in FIG. 1-A also contains a visual test meter 10, switches for circuit testing means 11, an alarm 12, polarity & circuit test lights 13 & 14, and alarm connection 12-A.

FIGS. 2A, 2B and 2C show a feature of the invention wherein a rotatable single entry disc 7 shown in FIG. 2-C is attached to the socket 3 shown in FIG. 2-B exposing only one of the two ground entrys. FIG. 2-A shows the pointer 9, the four way entry socket 3 shown in FIG. 2-B. The pointer 9 is shown in FIGS. 2-A and 2-C and the single entry rotating mask disc 7 shown in FIG. 2-A. FIG. 2-C shows the combination of the socket 3 shown in FIG. 2-B and the rotatable disc 7 shown in FIG. 2-A with means for attachment to the socket 3 shown as a rivet means 8 in FIGS. 2-A and 2-B, or as in FIG. 2-C an external disc lock 8-A, locking the disc 7 over the socket 3.

FIG. 3 shows the adapter 1 with the socket 3 and the rotating mask disc 7 with the pointer 9 in their proper position, in a top side view.

FIG. 4 shows an electrical schematic view that facilitates the design function. It has a three wire plug 2, shown in FIG. 1-B a four wire socket 3, fuses 18 for circuit protection, diodes or resistors 22, alarm 12, switch 11 and an alarm jack 12-A for an external alarm connection to accomplish many safety tasks discussed in this specification of the present invention. It also shows the test meter 10, polarity and circuit testing lights 13 and 14 in a simple arrangement for operational advantages, the power supply shows current carrying wiring L-1 and L-2 and one input equipment grounding wire. The plug 2 on this invention conforms to standard parts both straight blade and twistlock design. The test meter 10 shows wiring and terminals 23 and low voltage alarm not shown connected to any internal or external means of alarm.

The use of this device on a three wire electrical system is apparent, it reliably functions as a polarity tester, polarity reverser, test meter for voltage readout when the polarity is correct or incorrect, an alarm and outside external connection, and circuit test lights. By inserting the three blades of the male end of the adpater shown in FIG. 3 into a receptacle having an equipment grounding wire the circuits of this device will immediately respond by circuit lights lighting up to indicte the condition of the circuits. The blades of the male end 2 shown in FIG. 1-B are electrically connected to the female socket 3 shown in FIG. 1C which has two grounding recess connections 6' and 6A, commonly connected to the one male ground blade prong 6 of FIG. 1-B. One test light 13 is connected to the grounding wire and the first current carrying prong 4 and the other test light to the equipment grounding wire and the second current carrying wire, therefore when the device is used on a electrical system having correct or reversed polarity it will light one of the two lights, for example a red one and a white one to show the condition of the electrical supply. When the white light comes on it indicates correct polarity which makes the electricity safe to use. When the red light comes on it shows reversed polarity which is unsafe to use until corrected. When both lights go on together it indicates the absence of a equipment grounding wire therefore being signal responsive to a ground fault condition. The light circuits are resistor protected and the ground carrying wire provides the ground to light the visual indicators. To correct the reversed polarity condition with this device a male plug of an appliance to be used would be inserted in the position of one of the two entrys 180° apart shown on FIG. 2-B. The simplification of the invention is accomplished by having a rotating mask disc 7 shown in FIG. 2A that fits over the four recesses shown in FIG. 2-B and it has a pointer 9 also shown in FIG. 2-A 2-B and 2-C that is lined up with the circuit test light that is on wherein the three recesses of the rotating mask disc 7 will allow only one entry into the adapter socket 3. You manually place the pointer 9 in line with the circuit light thats on and you have manually corrected a reverse polarity condition of mismated wiring if the red light was on. The circuit lights tell you if the hot and ground are in the correct configuration and if the equipment grounding wire is working whether the wires are mated or mismated that is very important safety information to know. The voltage test guage 10 of FIG. 1-A and FIG. 3 has two circuits which permit a voltage readout when the wires are mated and mismated by being connected on one side to the equipment grounding wire and the first current carrying wire, and by also being connected on the other side of the gauge to the equipment grounding wire and the second current carrying wire. Therefore it reliably shows the amount of volts in each circuit, an important feature. Another feature of the invention involves the circuit testing switches 11 which allow an on and off switch for the use of the voltage meter 10 on both circuits and a separate switch shown as a third switch on FIG. 1-A and FIG. 3 that controls the alarm function of the device, shown as 12 on FIG. 1-A. It also shows an external alarm connection that can be connected to an outside signal means conserving space. The alarm further aids the device of this invention by connection to the polarity test lights in the incorrect position it will offer the advantage of an audio alarm to a device that already has a visual means. In another feature the alarm 12 is connected to the voltage meter 10 so that when the voltage goes down below the safety level it would signal the alarm to go off which can be in the form of a buzzer or a light that signals low voltage. Many forms of resistor wiring in the voltage gauge 10 or pre-set mini relays would accomplish the low voltage alarm. FIG. 4 clearly shows the circuit elements wherein the equipment ground wire is connected to 6' and 6-A and then to the volt meter 10 to the circuit light 14 to the alarm 12, the switches 11. The hot wire is connected to the light 14 the recess 4' and the prong L-1, the alarm 12, the switches 11 and the volt gauge 10. The use of the device in an adapter as shown or as a connector having the advantage of a rotatable disc mask will provide tremendous safety in the use of three wire electricity.

Having disclosed my invention what I claim is:

1. A polarity testing adapter means for single phase three wire electrical systems having a hot wire, a ground carrying wire and an equipment grounding wire, comprising in combination, a three wire plug having first and second current carrying prongs, and a third prong connected to the third equipment grounding wire, fuse protected, a socket having first and second current carrying recessed contacts connected to said first and second prongs, and a third recessed contact connected to said third prong and the equipment grounding wire, a fourth recessed contact connected to said third recessed contact for connecting the grounding equipment wire so that a standard three wire plug may be connected to said socket in first and second positions for reversing polarity, a rotatable disc rotatably mounted on the socket having slotted holes to receive a standard three wire plug in one position when a plug engages the socket said rotatable disc being disposed to counterclockwise or clockwise rotation and settable to a position 180 degrees away for a second position entry for said plug, said rotating disc serviing as a mask to block one entry position, an arrow pointer attached to said rotatable disc for indicating one or more reference positions of the rotating disc, and circuit wires connected to said plug and said socket for testing or correcting said circuit.

2. Apparatus as in claim 1, wherein the rotating disc single entry mask and indicating pointer are in relatively concentric rotatable position turning 360° allowing single entry into a double entry socket, eliminating dangerous incorrect entry of the plug into said socket.

3. Apparatus as in claim 1, wherein the combination of said pointer on the rotating disc in cooperation with said indicating arrow pointer directs the use of the adapter in first and second positions for correct and incorrect socket use.

4. Apparatus as in claim 1, wherein said testing adapter contains a visual means of detecting low voltage conditions or high voltage by connection to the current carrying wires of the plug and connected to a visual gauge and an alarm for audio benefit, said connection being a terminal or actual alarm means embodied in the present invention.

5. Apparatus as in claim 1, wherein said testing adapter has circuit testing means in visual form showing voltage values on both correct and incorret positions of an adapter in use, further, that when said plug is intentionally reversed for test purposes it will read out the voltage and detect broken unconnected wiring faults.

6. Apparatus as in claim 1, wherein said testing adapter has additional means of testing individual circuits and equpment ground wiring, by means of individual test switches connected to the individual wires that readout on a test meter.

7. Apparatus as in claim 1, wherein said testing means is done by test lights connected to the wiring wherein a light would show reversed polarity and a second light shows correct polarity, such lights actually checkout the circuits and provide an identity for the pointer as to which way it should be rotated.

8. Apparatus as in claim 1, wherein said testing means is clearly marked by arrows on the body of the adapter, lining up with the arrows of the rotating disc mask on the socket, showing first and second positions.

9. Apparatus as in claim 1 wherein said adapter means of the present invention having said circuit wires connected as a tester, reverser, low voltage alarm, ground fault alarm allowing safe use of electricity in homes, factories and on boats wherever the green wire grounding conductor is important.

10. Apparatus as in claim 1, wherein the adapter has means to connect straight blade or twist lock arrangements on the plug of any designated amperage.

11. Apparatus as in claim 1, wherein ground fault is detected by said circuit wiring connecting a pair of test lights causing both of said test lights to operate when the equipment ground protection is unsafe.

12. Apparatus as in claim 1, wherein said adapter means is adaptable to various forms and sizes of test equipment, connectors, receptacles and adapters.

* * * * *